US008830908B2

(12) United States Patent
Duan et al.

(10) Patent No.: US 8,830,908 B2
(45) Date of Patent: Sep. 9, 2014

(54) APPARATUS AND METHOD FOR FACILITATING FALLBACK ACCESS SCHEMES

(75) Inventors: Long Duan, San Diego, CA (US); Shiau-He Tsai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 13/179,323

(22) Filed: Jul. 8, 2011

(65) Prior Publication Data

US 2012/0213058 A1  Aug. 23, 2012

Related U.S. Application Data

(60) Provisional application No. 61/444,670, filed on Feb. 18, 2011.

(51) Int. Cl.
*H04W 4/00* (2009.01)
*H04W 76/02* (2009.01)
*H04W 74/08* (2009.01)

(52) U.S. Cl.
CPC ........ *H04W 74/0841* (2013.01); *H04W 76/027* (2013.01)
USPC ............................ 370/328; 370/221; 370/332

(58) Field of Classification Search
USPC ......................................... 370/221, 328, 332
See application file for complete search history.

(56) References Cited

U.S. PATENT DOCUMENTS

| 5,862,487 | A  | * | 1/1999  | Fujii et al. ...................... 455/454 |
|-----------|----|---|---------|---------------------------------------------|
| 2008/0192660 | A1 | * | 8/2008  | Li et al. .......................... 370/294 |
| 2009/0052353 | A1 | * | 2/2009  | D'Amico et al. ............. 370/280 |
| 2009/0207760 | A1 | * | 8/2009  | Brunel et al. .................. 370/280 |
| 2009/0257421 | A1 | * | 10/2009 | Nakashima et al. .......... 370/345 |
| 2010/0080184 | A1 | * | 4/2010  | Tseng ............................ 370/329 |
| 2010/0135210 | A1 | * | 6/2010  | Kim et al. ..................... 370/328 |
| 2010/0272066 | A1 |   | 10/2010 | Wang et al. |
| 2010/0296467 | A1 | * | 11/2010 | Pelletier et al. ............... 370/329 |
| 2011/0013577 | A1 |   | 1/2011  | Wang et al. |
| 2012/0315878 | A1 | * | 12/2012 | Deng ............................ 455/411 |

FOREIGN PATENT DOCUMENTS

WO  2009048359 A1  4/2009
WO  2010124228 A2  10/2010

OTHER PUBLICATIONS

International Search Report and Written Opinion—PCT/US2012/025735—ISA/EPO—Jul. 25, 2012.

\* cited by examiner

*Primary Examiner* — Kenny Lin
(74) *Attorney, Agent, or Firm* — Kristine U. Ekwueme

(57) ABSTRACT

Systems and methodologies are described that facilitate random access procedures using one or more fallback access schemes after initial access attempts have failed. UE equipped to determine failure of a first access request to a first base station due to interference from a second base station. Further, a UE equipped to determine the failure can do so and implement one or more fallback access schemes in response to the determination. In one example, a fallback access scheme allows the UE to select a secondary carrier frequency for communications with the first base station. In another example, a fallback access scheme allows the UE to designate the first base station as inaccessible and communicate with other base stations.

48 Claims, 10 Drawing Sheets

APPARATUS AND METHOD FOR FACILITATING FALLBACK ACCESS SCHEMES

CLAIM OF PRIORITY UNDER 35 U.S.C. §119

The present application for patent claims priority to Provisional Application No. 61/444,670 entitled "APPARATUS AND METHOD FOR FACILITATING FALLBACK ACCESS SCHEMES" filed Feb. 18, 2011, and assigned to the assignee hereof and hereby expressly incorporated by reference herein.

BACKGROUND

1. Field

The present application relates generally to wireless communications, and more specifically to methods and systems for facilitating random access procedures using one or more fallback access schemes after initial access attempts have failed.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, time division synchronous code division multiple access (TD-SCDMA) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink (DL)) refers to the communication link from the base stations to the terminals, and the reverse link (or uplink (UL)) refers to the communication link from the terminals to the base stations. This communication link may be established via a single-in-single-out, multiple-in-signal-out or a multiple-in-multiple-out (MIMO) system.

Further, in time division synchronous code division multiple access (TD-SCDMA) systems, each TD-SCDMA frame may be divided into two subframes, each consisting of 7 time slots (TSs). In TD-SCDMA systems, a user equipment (UE) may perform a random access procedure to access the network. To facilitate the random access procedure, transmissions on the DL and UL may be aligned to avoid interference. To prevent DL signal cross interference with an uplink signal, a gap time may be used.

Generally, signals transmitted from a first base station may not interfere with signal reception at a second base station, as the signals from the first base station may be received at the second base station during the gap time, or the signal is too weak to interfere with uplink communications. However, in some cases, DL signals from a first base station may interfere with an uplink transmission slot at a second base station, and as such, may impede a UEs ability to access the second base station. Further, as a UE may select a serving base station based on the strength of DL transmissions, interference on a timeslot used for the random access procedure may repeatedly prohibit or impede a UE from access the base station.

Currently, when there is interference on a specified uplink channel used for access, access requests may be shifted into a traffic channel timeslot to avoid the interference. Such a process results on reduced uplink capacity for the system due to the fact that some uplink traffic channel timeslots are used for access transmissions. Further, in another current implementation, the gap time may be increased. For the same reasons as discussed above, an increase in gap time reduces the overall system capacity.

Therefore, there is a need for improved systems and methods for facilitating UE access procedures when access has failed due to interference on the uplink channel.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating random access procedures using one or more fallback access schemes after initial access attempts have failed. In one example, UE can be equipped to determine failure of a first access request to a first base station due to interference from a second base station. A UE equipped to determine the failure can do so and implement one or more fallback access schemes in response to the determination. In one example, a fallback access scheme allows the UE to select a secondary carrier frequency for transmission with the first base station. In another example, a fallback access scheme allows the UE to designate the first base station as inaccessible and communicate with other base stations.

According to related aspects, a method for facilitating random access procedures using one or more fallback access schemes after initial access attempts have failed is provided. The method can comprise determining failure of a first access request to a first base station due to interference from a second base station. The method can also include implementing one or more fallback access schemes in response to the determination.

Another aspect relates to a wireless communications apparatus. The wireless communications apparatus can include at least one processor configured to determine failure of a first access request to a first base station due to interference from a second base station. The processor is further configured to implement one or more fallback access schemes in response to the determination.

Yet another aspect relates to a wireless communications apparatus that facilitates random access procedures using one or more fallback access schemes after initial access attempts have failed. The wireless communications apparatus can comprise means for determining failure of a first access request to a first base station due to interference from a second base station. The wireless communications apparatus can additionally include means for implementing one or more fallback access schemes in response to the determination.

Still another aspect relates to a computer program product, which can have a computer-readable medium including code for causing at least one computer to determine failure of a first access request to a first base station due to interference from a second base station. The computer-readable medium can also comprise code for causing the at least one computer to implement one or more fallback access schemes in response to the determination.

According to related aspects, a method for facilitating random access procedures by a base station is provided. The method can comprise determining, by a first base station, a failure to decode a signal from a UE. The method can also include detecting that a signal received from a secondary base station is above an interference threshold. Moreover, the method can include broadcasting, using a primary carrier frequency, one or more secondary carrier frequencies for the UE to use for an initial access request.

Another aspect relates to a wireless communications apparatus. The wireless communications apparatus can include at least one processor configured to determine, by a first base station, a failure to decode a signal from a UE. The processor is further configured to detect that a signal received from a secondary base station is above an interference threshold. Moreover, the processor is configured to broadcast, using a primary carrier frequency, one or more secondary carrier frequencies for the UE to use for an initial access request.

Yet another aspect relates to a base station that facilitates random access procedures. The base station can comprise means for determining, by a first base station, a failure to decode a signal from a UE. The base station can additionally include means for detecting that a signal received from a secondary base station is above an interference threshold. Moreover, the base station can include means for broadcasting, using a primary carrier frequency, one or more secondary carrier frequencies for the UE to use for an initial access request.

Still another aspect relates to a computer program product, which can have a computer-readable medium including code for causing at least one computer to determine, by a first base station, a failure to decode a signal from a UE. The computer-readable medium can also comprise code for causing the at least one computer to detect that a signal received from a secondary base station is above an interference threshold. Moreover, the computer-readable medium can comprise code for causing the at least one computer to broadcast, using a primary carrier frequency, one or more secondary carrier frequencies for the UE to use for an initial access request To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, when a UE attempts to access a base station, e.g. node-B, the access request may be communicated using a limited portion a TS. Further, as noted above, a UE may determine the access attempt has failed, and may implement one or more fallback access schemes in order to minimize facilitate access to a useable base station.

Figure 1:
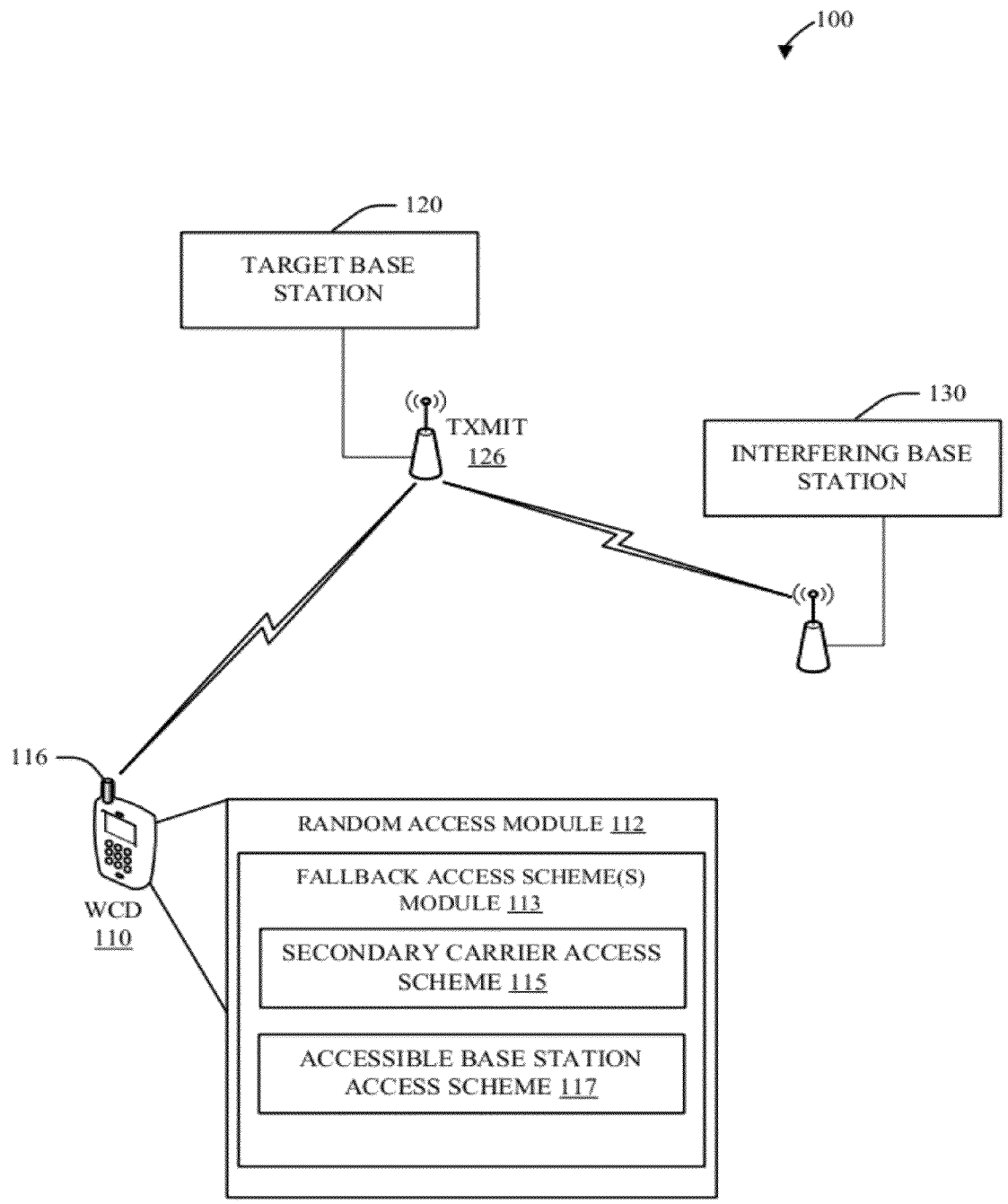
FIG. 1 depicts a block diagram of a system for facilitating fallback random access procedures in a wireless communication system, according to an aspect.

With reference now to FIG. 1, a block diagram of a system 100 for facilitating fallback access schemes in a wireless communication system is illustrated. System 100 may include one or more base stations 120, 130 (e.g. Node-B, E-Node-B, etc.) and one or more user equipments (UEs) 110 (e.g. wireless communications devices (WCD), terminals, etc.), which can communicate via respective antennas 126 and 116. In one aspect, a target base station 120 may conduct a DL communication to UE 110 via antennas 126. At the UE 110, the DL communications may be used to determine with which base station a random access procedure may be performed. In one aspect, UE 120 may receive DL communications received via antennas 116. Further UE 110 may attempt to conduct UL communications to target base station 120 via antennas 116 to facilitate random access procedures. At the target base station 120, UL communications may be received via antennas 126. Further, interference signals may also be received from interfering base station 130 that may impede processing of an access request from UE 110.

In one aspect of the system, UE 110 may attempt to communicate with target base station 120 using a random access procedure facilitated through random access module 112. Such random access communications may be set up using various parameters determined through random access module 112. In operation, due to interference from interfering base station 130, the random access procedure may fail to connect with UE 110 with the target base station 120.

In another aspect, random access module 112 further includes one or more fallback access schemes 113 to facilitate accessing a base station (e.g., base station 120) after initial access attempts have failed. In such an aspect, fallback access schemes may include a secondary carrier access scheme 115, an accessible base station access scheme 117, etc.

In one aspect, secondary carrier access scheme 115 may be operable to enable UE 110 to select one of N secondary frequencies used in access network 100. In such an aspect, the secondary frequency may be selected to be the secondary frequency that has been measured to have the lowest interference levels. In another aspect, the secondary frequency may be randomly selected. Generally, since a downlink pilot signal may be transmitted on a primary frequency, secondary frequencies may not experience other base station downlink communication interference on a secondary frequency. As used herein, a primary frequency may refer to a frequency used by a target base station 120 to transmit a downlink pilot signal using a downlink pilot channel (DwPCH). Further, any secondary frequency of N secondary frequencies may describe any frequency that the target base station 120 is not using as a primary frequency. Currently, a UE 110 may transmit and a base station 120 may receive uplink pilot channel (UpPCH) information on a secondary frequency is supported for handover procedures. Amendment to the current TD-SCDMA standard may support a base station 120 to addition receive UpPCH transmissions for initial access requests, such as used in a random access procedure.

In operation, once secondary carrier access scheme 115 has selected a secondary frequency, an access request may be transmitted to the target base station 120 using the selected secondary frequency. Further, in one aspect, upon detecting uplink interference on a primary frequency, the target base station 120 may transmit secondary frequency information on a broadcast channel. Thereafter, UE 110 may select a secondary frequency for performing a random access procedure. In one aspect, the random access procedure may include transmitting an access request on an UpPCH and may receive a response back over a fast physical access channel (FPACH).

In another aspect, an accessible base station access scheme 117 may enable a UE 110 to remove inaccessible base stations from an initial access assessment list. In one such aspect, a base station defined as inaccessible may be removed from an assessment list for a defined duration of time.

In operation, accessible base station access scheme 117 may determine the UE 110 has failed random access on target base station's 120 primary frequency because its UpPCH transmissions have not answered by the network 100. Upon detecting the failure, the UE 110 may internally mark this cell as "inaccessible." In one aspect, the UE 110 may consider the marked base station 120 to be accessible again upon the expiration of a timer. Further, upon detecting the base station 120 is marked "inaccessible", the UE 110 may perform base station reselection and select a base station that is not marked as inaccessible. In one aspect, base station reselection may be based on the reselection criteria specified in the current TD-SCMA standard. Thereafter, upon selecting a base station that is not marked as inaccessible, the UE 110 may perform a random access procedure with the newly selected base station.

Therefore the proposed systems and methods can assist in allowing a UE to access a base station even where interference impedes initial access attempts, and as such, may improve overall system performance.

Figure 2:
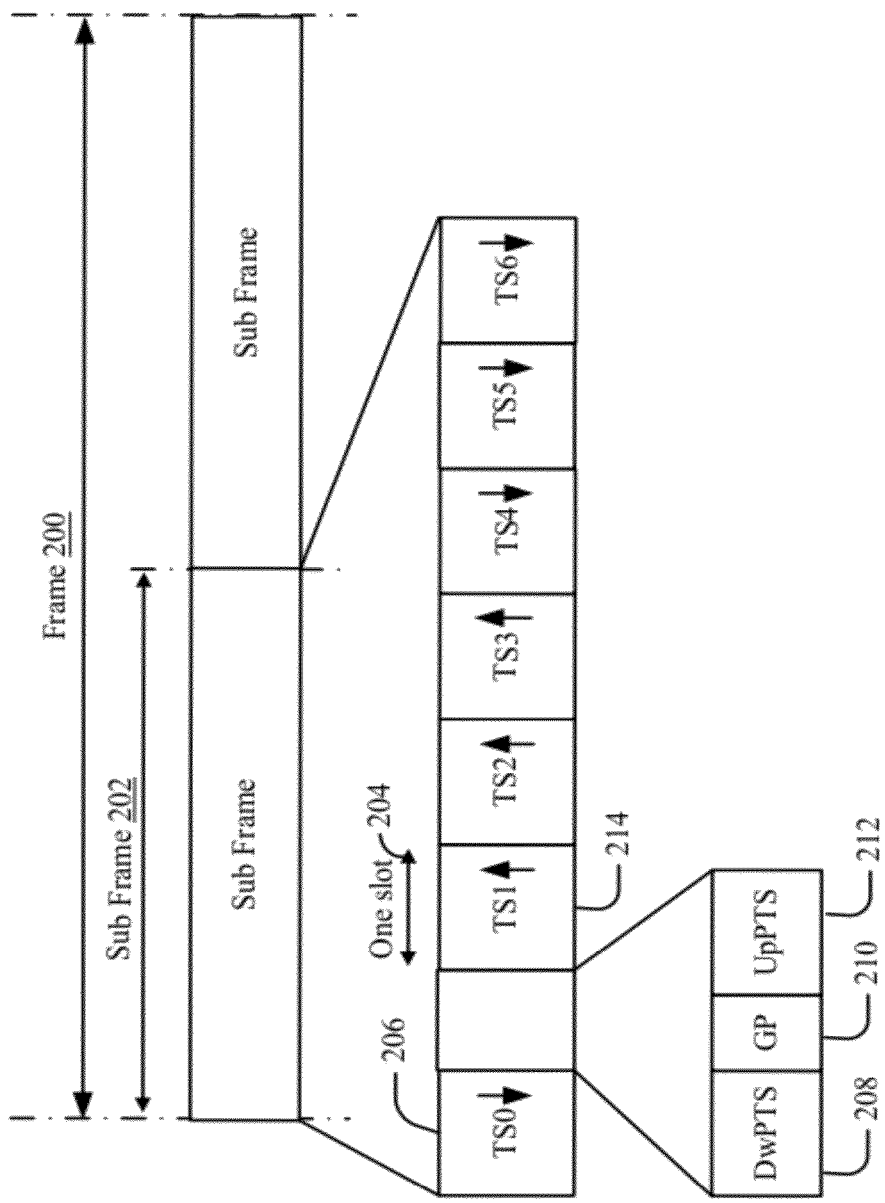
FIG. 2 depicts an example frame structure for a TD-SCMA frame according to an aspect.

With reference to FIG. 2 an example frame structure of a TD-SCDMA 200 is depicted. In time division synchronous code division multiple access (TD-SCDMA) systems, each TD-SCDMA frame 200 may be divided into two subframes 202, each consisting of 7 time slots 204 (TSs). The subframe 202 may start with downlink (DL) TSO 206, DwPTS (Downlink Pilot Time Slot) 208, Gap 210, UpPTS (Uplink Pilot time Slot) 212, and one or more uplink (UL) TSs 214, and then a few DL TSs. In the depicted example aspect, three (3) TSs may be used for UL and four (4) TSs may be used for DL. Further, the chip rate in a TD-SCDMA system may be 1.28 Mcps. As such, 7 Time Slots (TSs) may be used for the regular traffic and signaling. The DwPTS may be used for transmitting a pilot signal for the cell. While the UpPTS may be used for the UEs to perform initial random access procedure, and UL synchronization in handover.

Figure 3:
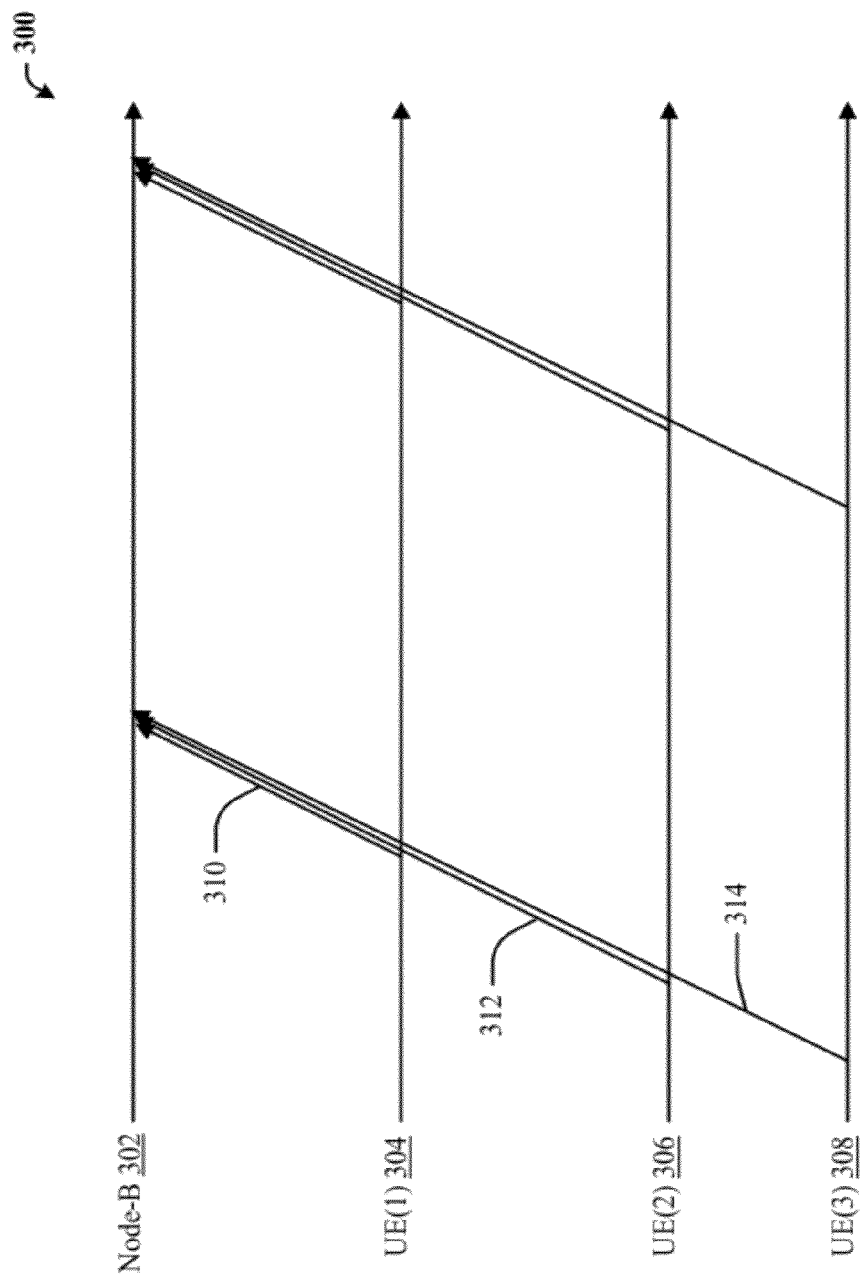
FIG. 3 depicts an example TD-SCDMA based system with multiple UEs communicating with a node-B, as time progresses according to an aspect.

Turning now to FIG. 3, an example TD-SCDMA based system 300 with multiple UEs (304, 306, 308) communicating with a node-B 302, as time progresses, is illustrated. Generally, in TD-SCDMA systems, multiple UEs may share a common bandwidth in communication with a node-B 302. Additionally, one aspect in TD-SCDMA systems, as compared to CDMA and WCDMA systems, is UL synchronization. That it, in TD-SCDMA systems, different UEs (304, 306, 308) may synchronize on the uplink (UL) such that all UE (304, 306, 308) transmitted signals arrives at the Node B (NB) at approximately the same time. For example, in the depicted aspect, various UEs (304, 306, 308) are located at various distances from the serving node-B 302. Accordingly, in order for the UL transmission to reach the node-B 302 at approximately the same time, each UE may originate transmissions at different times. For example, UE 308 may be farthest from node-B 302 and may perform an UL transmission 314 before closer UEs. Additionally, UE 306 may be closer to node-B 302 than UE 308 and may perform an UL transmission 312 after UE 308. Similarly, UE 304 may be closer to node-B 302 than UE 306 and may perform an UL transmission 310 after UEs 306 and 308. The timing of the UL transmissions (310, 312, 314) may be such that the signals arrive at the node-B at approximately the same time.

Figure 4:
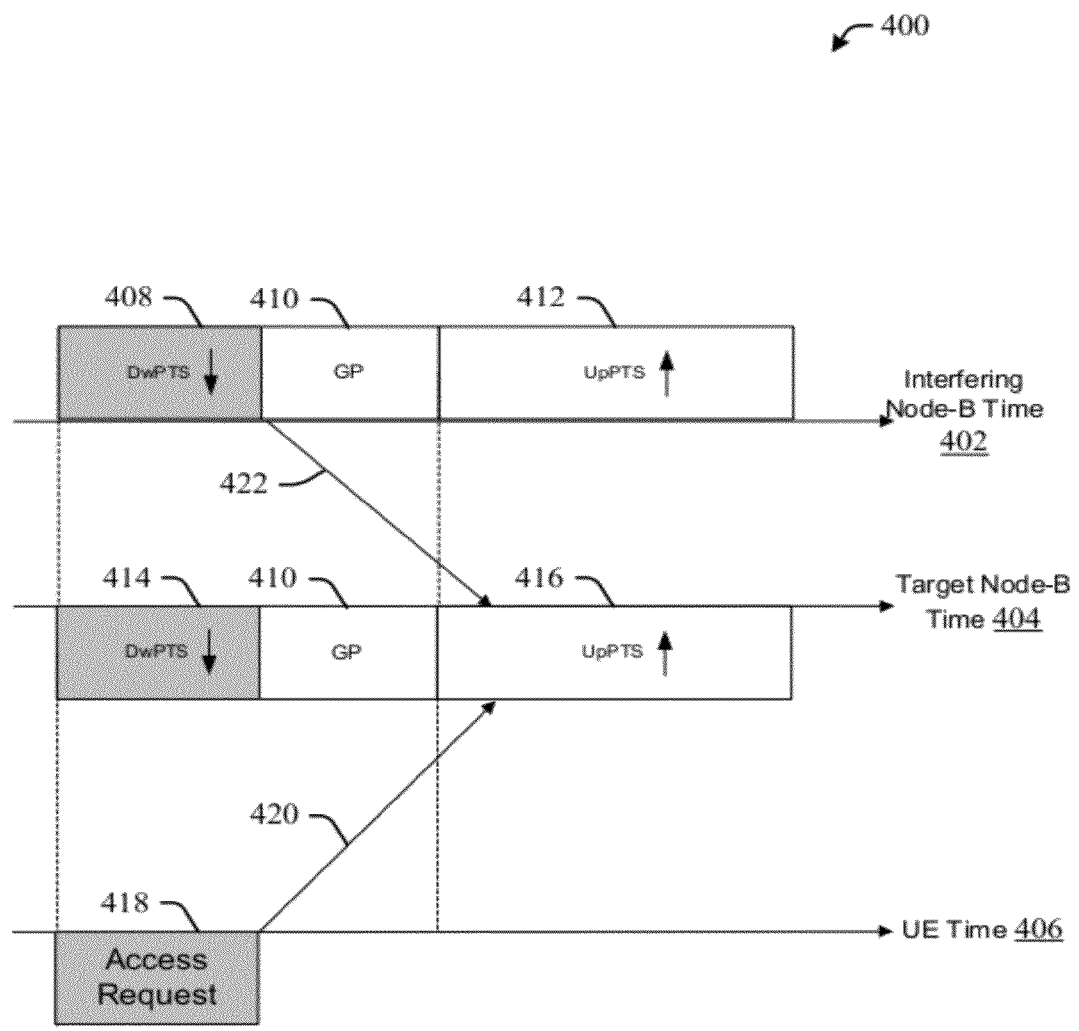
FIG. 4 depicts an example UL transmission including interference from a interfering base station, according to an another aspect.

Turning now to FIG. 4, example transmissions from a UE to a target node-B and an interfering node-B transmissions are illustrated in an access network 400. Depicted in the figure are transmission timing for an interfering node-B 402, a target node-B 404 and a UE 406. As depicted in FIG. 2, a subframe may include a downlink (DL) TSO, Downlink Pilot Time Slot (DwPTS) 408, a Gap 410, an Uplink Pilot time Slot (UpPTS) 412, one or more uplink (UL) TSs, and then a few DL TSs. In operation, a UE may transmit 420 an access request 418 to be received by a target node-B during an UpPTS 416. Further, due to factors such as improper network design, propagation delay, etc., a signal transmitted 422 on an interfering node-B DwPTS may be received during the target node-B UpPTS 416. Such interference 422 may impede and/or prohibit a UEs access request 418 transmission 420 from being received and processed by the target node-B.

Figure 5:
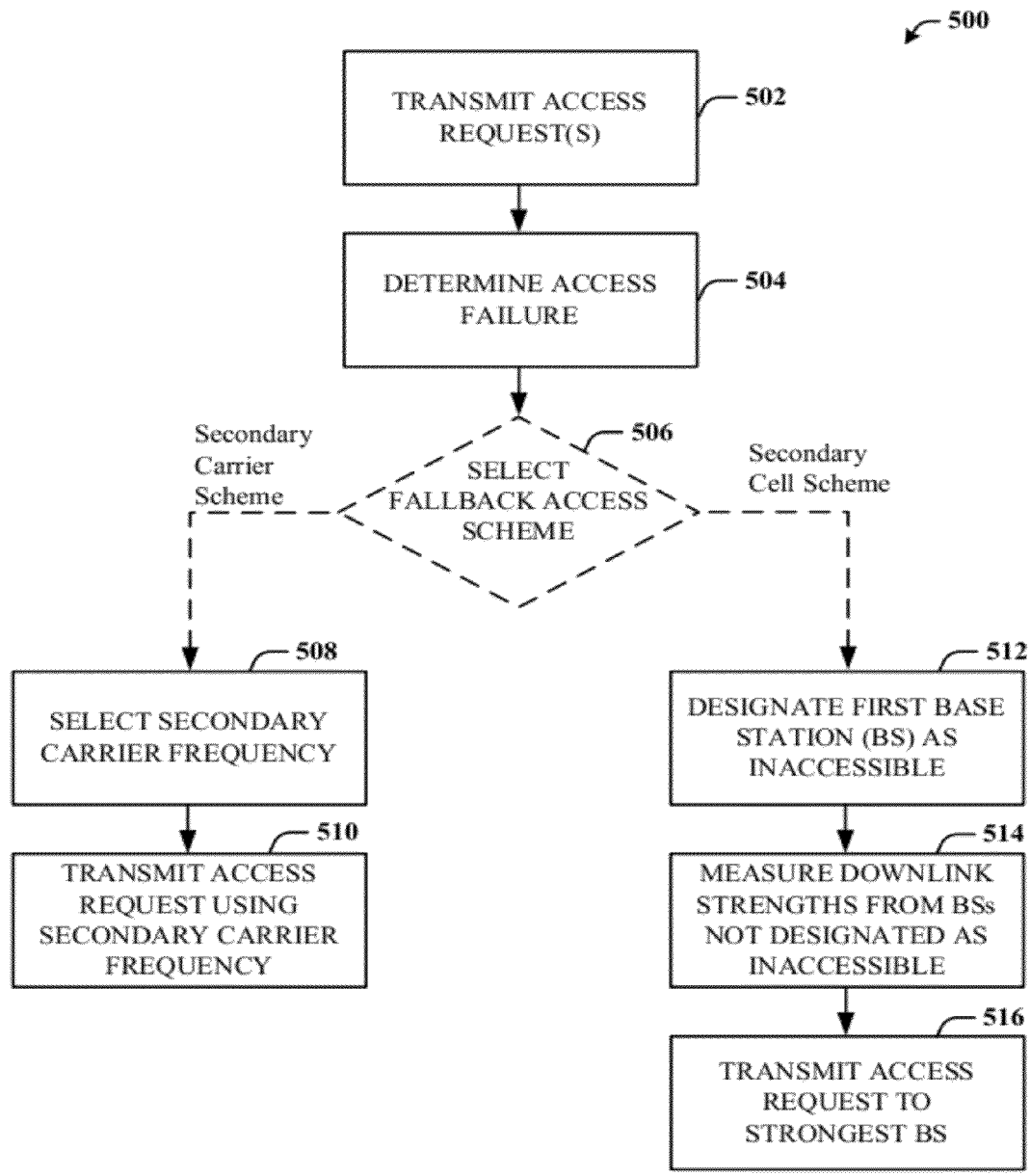
FIG. 5 depicts an example flowchart of a methodology for facilitating fallback random access schemes according to an aspect.

FIG. 5 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 5, an example flowchart 500 of a methodology for facilitating fallback access schemes is illustrated. In one aspect, the methodology may be enabled in various systems, such as a TD-SCDMA system, Universal Mobile Telecommunication System time division duplex (UMTS TDD), etc. At block 502, a UE may transmit one or more access requests to a target base station as part of a random access procedure. At block 504, the UE may determine the random access procedure has failed. In one aspect, the determination may be made after a defined number of unsuccessful attempts have been performed. Optionally, at block 506, one or more fallback access schemes may be selected and implemented by the UE. As used herein, a selection may be implemented in various ways. In one aspect, the one or more fallback access scheme selection may be predetermined in the UE. In another aspect, the UE may be configurable to provide a priority to one or more fallback access schemes over other fallback access schemes. For example, the UE may use an algorithm to determine the optimal approach. In another aspect, the UE may use components of different fallback access schemes. For example, the UE may decide to access the network on the secondary frequency of a neighbor base station. In another aspect, a UE may select only one fallback scheme. In yet another aspect, a UE may be enabled to contemporaneously implement multiple fallback access schemes. In still a further aspect, a UE may be enabled to implement multiple fallback access schemes as a series of schemes.

In one example aspect, where a secondary carrier fallback access scheme is selected, at block 508, the UE may select a secondary carrier frequency to use for a random access procedure. A secondary carrier fallback scheme may be implemented in a system using an N-frequency (e.g., N-Carrier) deployment. An N-Frequency deployment supports multiple carriers in TD-SCDMA systems. In an N-frequency deployment, the carriers may not independent. Among the aggregated carriers, one carrier may be defined as the primary carrier, which carries the broadcast channel (e.g., BCH mapped to P-CCPCH) in time slot 0. The remaining carriers may be defined as secondary carriers and system information may not be broadcasted on these carriers.

Further, besides carrying the broadcast channel, the PCH and FACH on S-CCPCH, as well as DwPCH and PICH may also be transmitted on primary frequency only. As such, generally a UE in idle mode may camp on the primary frequency and RRC connection setup procedures may be initiated from the primary frequency. Further, channel mapping, transmission and reception, power and synchronization control, etc., on each carrier may be independent of other carriers. Further, traffic channels may be transmitted on any of the N carriers. In one aspect, benefits of reduced frequency reuse factor in TSO may include: reduced DwPTS interference between neighboring cells, expanding TSO and DwPTS coverage, reduced ping-pong handovers, etc.

In one aspect, where an N-Frequency deployment is enabled in a HSDPA system, radio resources may be assigned on multiple frequencies, and the UE supporting N-Frequency deployment, may have the capability of transmitting and receiving on multiple frequencies. In another aspect, where N-Frequency deployment is enabled in neighboring TD-SCDMA cells, each cell may transmit BCH (TSO) on just one frequency, e.g., the primary frequency. Further, by assigning a primary frequency on different frequency points among neighboring cells, a smaller frequency reuse factor may be achieved.

In such an aspect, the secondary frequency may be selected to be the secondary frequency that has been measured to have the lowest interference levels. In another aspect, the secondary frequency may be randomly selected. Generally, since a downlink pilot signal may be transmitted on a primary frequency, secondary frequencies may not experience other base station downlink communication interference on a secondary frequency. At block 510, the UE may transmit an access request to a base station using the selected secondary frequency. In one aspect, the random access procedure may include transmitting an access request on an UpPCH and may receive a response back over a fast physical access channel (FPACH).

In another example aspect, where a secondary cell fallback access scheme is selected, at block 512, the UE may designate the base station with which the initial access attempt failed as being "inaccessible." At block 514, the UE may perform downlink strength measurements to determine which BS to attempt to access. In such an aspect, the UE may not perform measurements on base stations that have been labeled as inaccessible. In one such aspect, a base station defined as inaccessible may be removed from an assessment list for a defined duration of time. At block 516, the UE may transmit an access request to a base station selected from the measurements. In one aspect, base station reselection may be based on the reselection criteria specified in the current TD-SCMA standard.

Figure 6:
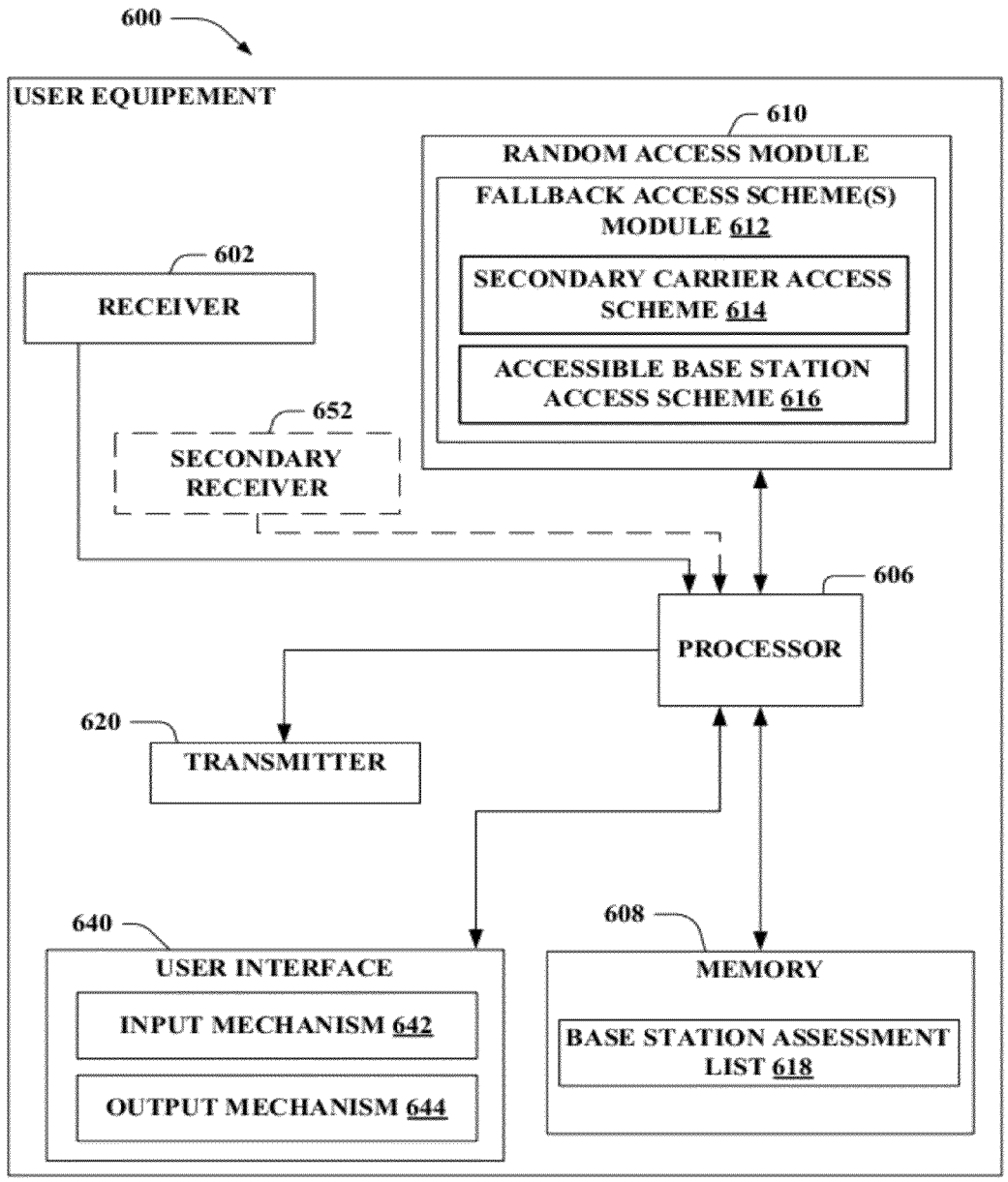
FIG. 6 depicts a block diagram of an example user equipment for facilitating fallback random access schemes according to an aspect.

With reference now to FIG. 6, an illustration of a user equipment (UE) 600 (e.g. a client device, wireless communications device (WCD) etc.) that facilitates uplink synchronization during random access procedures is presented. UE 600 comprises receiver 602 that receives one or more signal from, for instance, one or more receive antennas (not shown), performs typical actions on (e.g., filters, amplifies, downconverts, etc.) the received signal, and digitizes the conditioned signal to obtain samples. Receiver 602 can further comprise an oscillator that can provide a carrier frequency for demodulation of the received signal and a demodulator that can demodulate received symbols and provide them to processor 606 for channel estimation. In one aspect, UE 600 may further comprise secondary receiver 652 and may receive additional channels of information.

Processor 606 can be a processor dedicated to analyzing information received by receiver 602 and/or generating information for transmission by one or more transmitters 620 (for ease of illustration, only one transmitter is shown), a processor that controls one or more components of UE 600, and/or a processor that both analyzes information received by receiver 602 and/or receiver 652, generates information for transmission by transmitter 620 for transmission on one or more transmitting antennas (not shown), and controls one or more components of UE 600. In one aspect of UE 600, processor 606 may include at least one processor and memory, wherein the memory may be within the at least one processor 606. By way of example and not limitation, the memory could include on-board cache or general purpose register.

UE 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.). In one aspect, memory 608 may include a base station assessment list 618 that may be populated with base stations that have not been designated as inaccessible.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods is intended to comprise, without being limited to, these and any other suitable types of memory.

UE 600 can further have random access module 610 that assists the UE 600 with initial access to a network. In one aspect, random access module 610 further includes one or more fallback access schemes 612 to facilitate accessing a base station (e.g., base station 120) after initial access attempts have failed. In such an aspect, fallback access schemes may include a secondary carrier access scheme 614, an accessible base station access scheme 616, etc.

In one aspect, secondary carrier access scheme 614 may be operable to enable UE 600 to select one of N secondary frequencies used in an access network. In such an aspect, the secondary frequency may be selected to be the secondary frequency that has been measured to have the lowest interference levels. In another aspect, the secondary frequency may be randomly selected. Generally, since a downlink pilot signal may be transmitted on a primary frequency, secondary frequencies may not experience other base station downlink communication interference on a secondary frequency. In operation, once secondary carrier access scheme 614 has selected a secondary frequency, an access request may be transmitted to a target base station (e.g., target base station 120) using the selected secondary frequency. Further, in one aspect, upon detecting uplink interference on a primary frequency, the target base station may transmit secondary frequency information on a broadcast channel. Thereafter, UE 500 may select a secondary frequency for performing a random access procedure.

In one aspect, an accessible base station access scheme 616 may enable a UE 110 to remove inaccessible base stations from an initial access assessment list 618. In one such aspect, a base station defined as inaccessible may be removed from an assessment list 618 for a defined duration of time. In operation, accessible base station access scheme 616 may determine the UE 600 has failed random access on cell's primary frequency because all its UpPCH transmissions are not answered by the network. Upon detecting the failure, the UE may internally mark this cell as "inaccessible." In one aspect, the UE 600 may consider the marked base station to be accessible again upon the expiration of a timer. Further, upon detecting the base station is marked "inaccessible", the UE 600 may perform base station reselection and select a base station that is not marked as inaccessible. In one aspect, base station reselection may be based on the reselection criteria specified in the current TD-SCMA standard. Thereafter, upon selecting the base station that is not marked as inaccessible, the UE 600 may perform a random access procedure with the newly selected base station.

When sending the RACH message to the network (during the random access procedure), the UE shall include downlink signal measurements, which will indicate that the UE may not be in the best downlink cell due to the uplink jamming. With this information, the network can allocate the UE to the best downlink cell if the downlink and uplink traffic channel timeslots on the cell are not jammed. In this way, the UE is maintained at the strongest cell for traffic channels.

Additionally, client device 600 may include user interface 640. User interface 640 may include input mechanisms 642 for generating inputs into WCD 600, and output mechanism 642 for generating information for consumption by the user of wireless device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, output mechanism 644 may include a display operable to present content that is in image or video format or an audio speaker to present content that is in an audio format.

Figure 7:
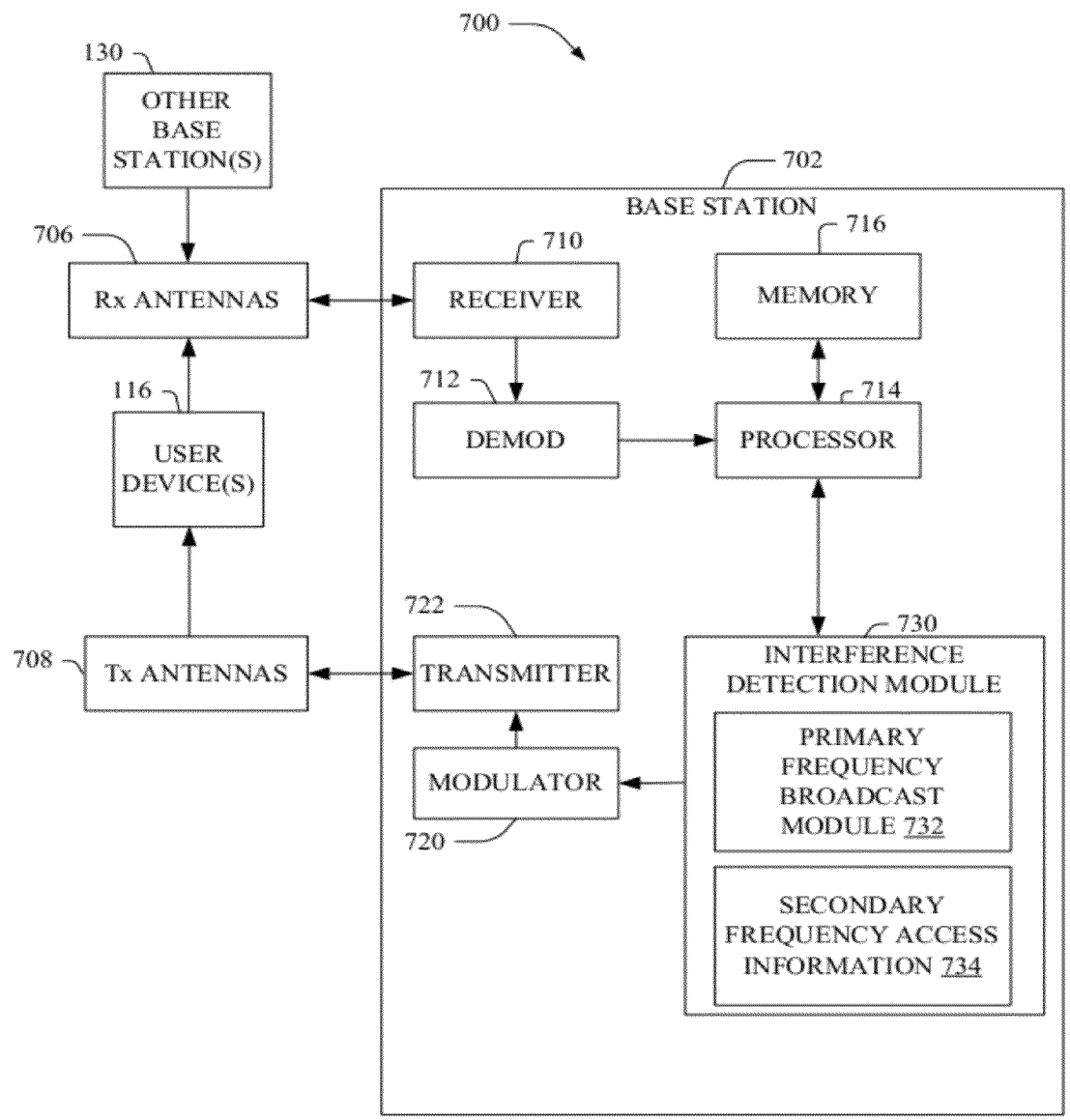
FIG. 7 depicts a block diagram of an example base station for facilitating fallback random access schemes according to an aspect.

With reference to FIG. 7, an example system 700 that comprises a base station 702 with a receiver 710 that receives signal(s) from one or more user devices 116 through a plurality of receive antennas 706, and a transmitter 722 that transmits to the one or more user devices 116 through a transmit antenna 708. Receiver 710 can receive information from receive antennas 706 and is operatively associated with a demodulator 712 that demodulates received information. Transmitter 722 can transmit information using transmit antennas 708 and is operatively associated with a modulator 720 that modulates information for transmission. Furthermore, base station 702 can receive interference from one or more other base stations 130. In one aspect, such received signals interfere with user devices 116 attempt to initially access base station 702. Demodulated symbols are analyzed by a processor 714, and which is coupled to a memory 716 that stores, among other items, information related to mobile device initial access attempts. Processor 714 can be a processor dedicated to analyzing information received by receiver 710 and/or generating information for transmission by a transmitter 722, a processor that controls one or more components of base station 702, and/or a processor that both analyzes information received by receiver 710, generates information for transmission by transmitter 722, and controls one or more components of base station 702. As noted above, base station 702 can additionally comprise memory 716 that is operatively coupled to processor 714. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 716 of the subject apparatus and methods is intended to comprise, without being limited to, these and any other suitable types of memory.

Processor 714 is further coupled to interference detection module 730. Interference detection module 730 may include primary frequency broadcast module 732, and secondary frequency access information 734. In one aspect, base station 702 may receive one or more signals from various sources, such as but not limited to user devices 116 and one or more other base stations 130. Interference detection module 730 may determine a failure to decode a signal from a user device 116. Further, interference detection module 730 may detect that the signal from the user device 116 is being interfered with by signals being received from one or more other base stations 130. In such an aspect, interference detection module 730 may include secondary frequency access information 734 in a broadcast transmitted using a primary frequency broadcast module 732 to provide user devices 116 with alternative frequencies to use for initial access.

Figure 8:
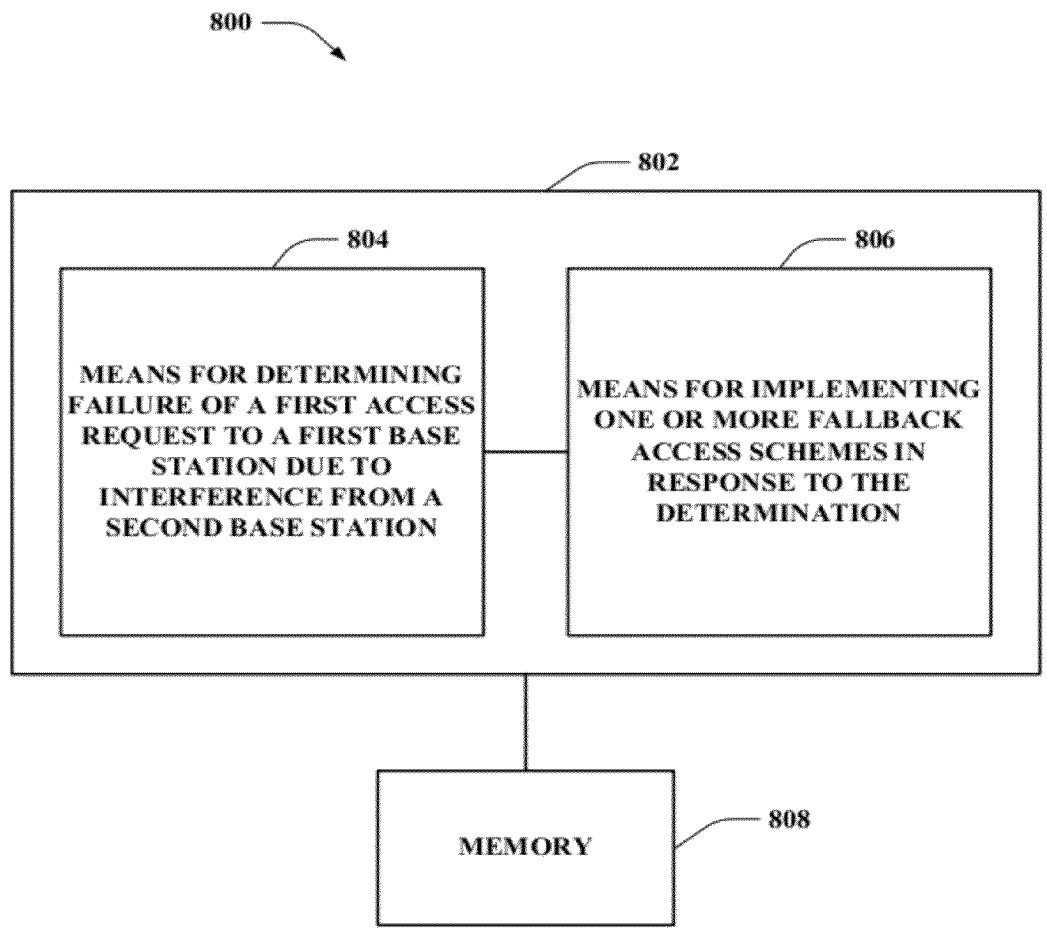
FIG. 8 depicts an example system for facilitating fallback random access procedures in a wireless communication system.

Referring to FIG. 8, an apparatus 800 that facilitates random access procedures using one or more fallback access schemes after initial access attempts have failed can reside at least partially within a mobile device. It is to be appreciated that apparatus 800 is represented as including functional blocks, which can represent functions implemented by a processor, software, or combination thereof (e.g., firmware). As such, apparatus 800 includes a logical grouping 802 of electrical components that can act in conjunction. For instance, logical grouping 802 can include means for determining failure of a first access request to a first base station due to interference from a second base station (Block 804). For example, in an aspect, the means 804 can include random access module 610 and/or processor 606. Further, logical grouping 802 can include means for implementing one or more fallback access schemes in response to the determination (Block 806). For example, in an aspect, the means 806 can include random access module 610 and/or processor 606.

Additionally, apparatus 800 can include a memory 808 that retains instructions for executing functions associated with electrical components 804 and 806. While shown as being external to memory 808, it is to be understood that one or more of electrical components 804 and 806 can exist within memory 808. In an aspect, for example, memory 808 may be the same as or similar to memory 608 (FIG. 6).

Figure 9:
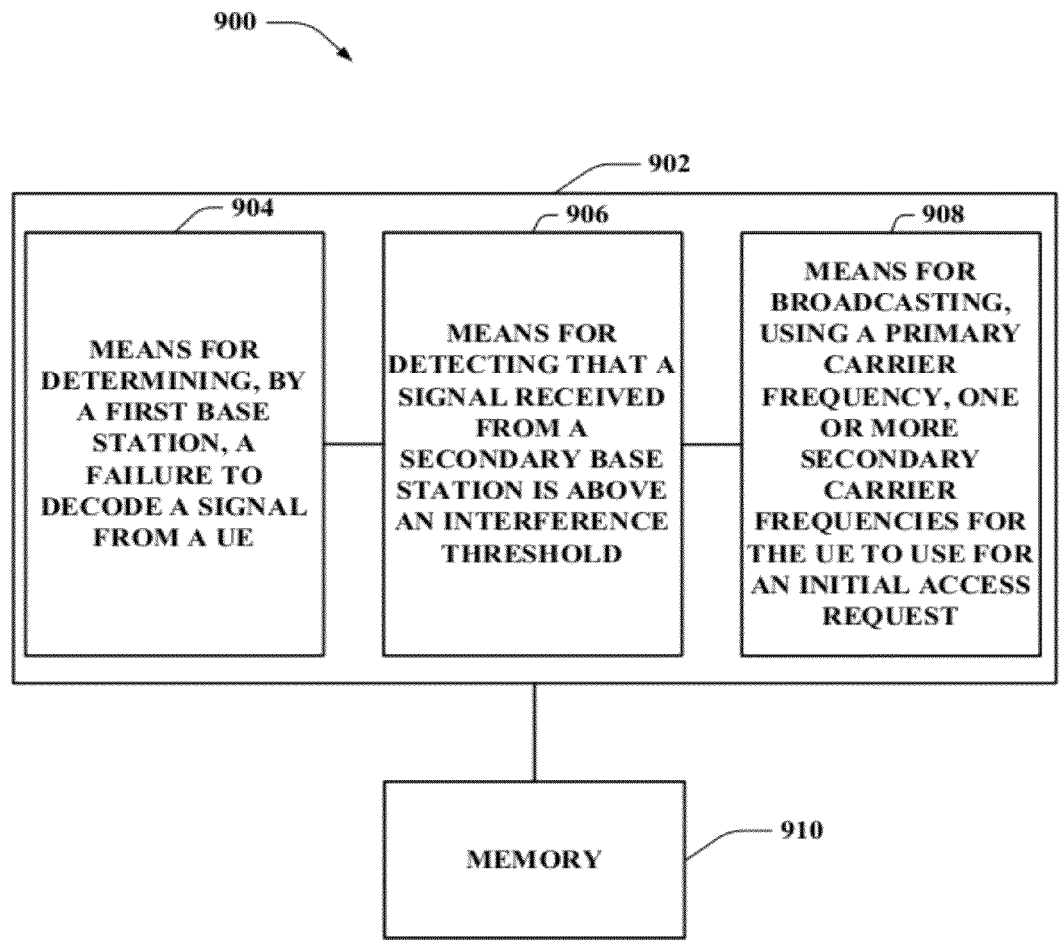
FIG. 9 depicts an example system for facilitating fallback random access procedures by a base station.

Referring to FIG. 9, an apparatus 800 that facilitates random access procedures can reside at least partially within a base station. It is to be appreciated that apparatus 900 is represented as including functional blocks, which can represent functions implemented by a processor, software, or combination thereof (e.g., firmware). As such, apparatus 900 includes a logical grouping 902 of electrical components that can act in conjunction. For instance, logical grouping 902 can include means for determining, by a first base station, a failure to decode a signal from a UE (Block 904). For example, in an aspect, the means 904 can include interference detection module 730 and/or processor 714. Further, logical grouping 902 can include means for detecting that a signal received from a secondary base station is above an interference threshold (Block 906). For example, in an aspect, the means 906 can include interference detection module 730 and/or processor 714. Moreover, logical grouping 902 can include means for broadcasting, using a primary carrier frequency, one or more secondary carrier frequencies for the UE to use for an initial access request (Block 908). For example, in an aspect, the means 908 can include interference detection module 730 and/or processor 714.

Additionally, apparatus 900 can include a memory 910 that retains instructions for executing functions associated with electrical components 904, 906, and 908. While shown as being external to memory 910, it is to be understood that one or more of electrical components 904, 906, and 908 can exist within memory 910. In an aspect, for example, memory 808 may be the same as or similar to memory 716 (FIG. 7).

Figure 10:
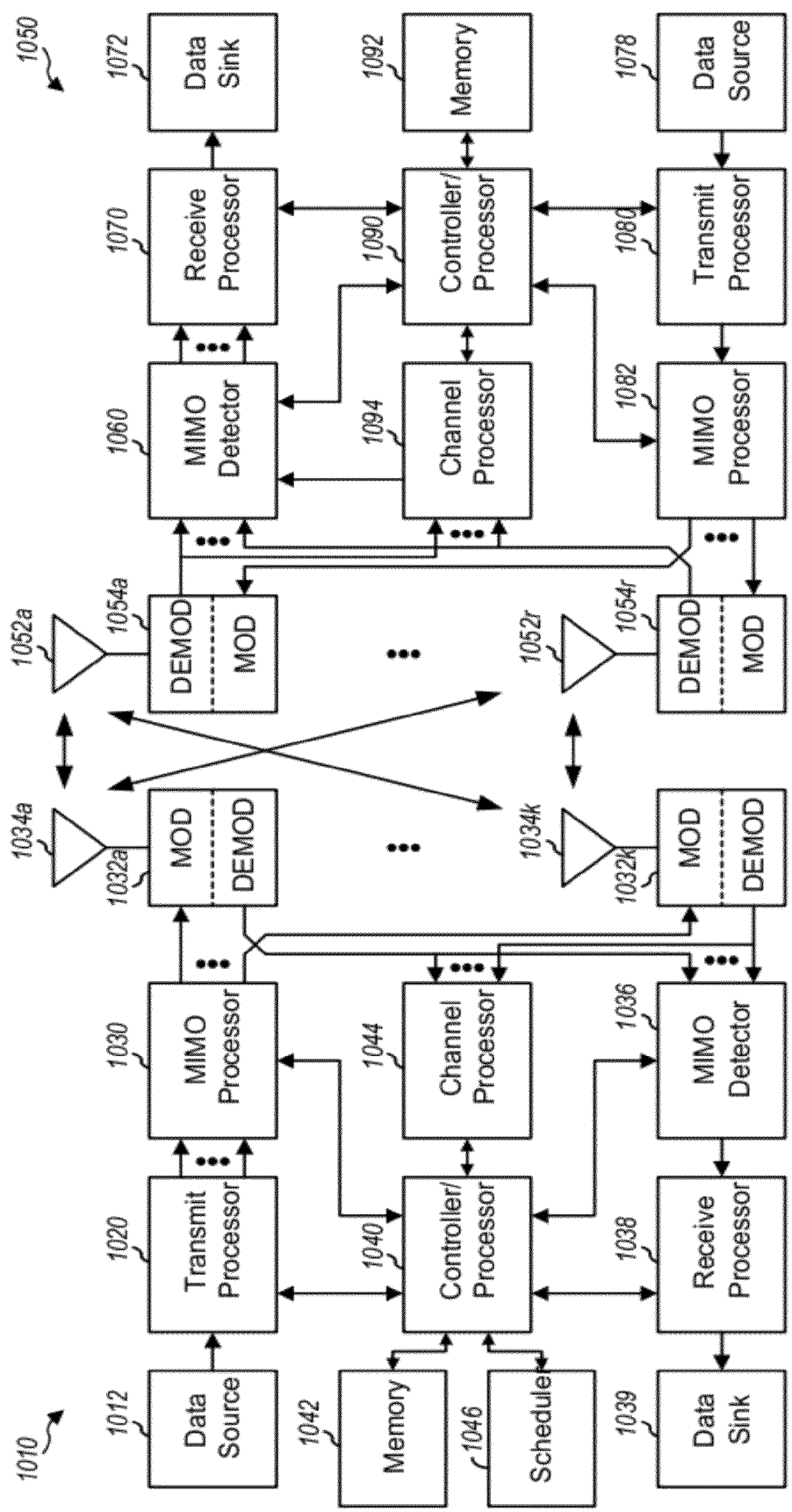
FIG. 10 illustrates a block diagram of a design of a base station and a UE in an access network.

FIG. 10 shows a block diagram of a design of a base station 1010 and a UE 1050. A base station may also be referred to as a Node B, an evolved Node B (eNB), an access point, etc. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. In the design shown in FIG. 10, base station 1010 is equipped with K antennas 1034a through 1034k, and UE 1050 is equipped with R antennas 1052a through 1052r, where in general K≥1 and R≥1.

At base station 1010, a transmit processor 1020 may receive data for one or more UEs from a data source 1012, process (e.g., encode and modulate) the data for each UE based on one or more modulation and coding schemes for that UE, and provide data symbols for all UEs. Transmit processor 1020 may also generate control symbols for control information. Transmit processor 1020 may further generate reference/pilot symbols for one or more reference signals. A MIMO processor 1030 may perform precoding on the data symbols, the control symbols, and/or the reference symbols, if applicable, and may provide K output symbol streams to K modulators (MOD) 1032a through 1032k. Each modulator 1032 may process its output symbol stream (e.g., for OFDM) to obtain an output sample stream. Each modulator 1032 may further condition (e.g., convert to analog, filter, amplify, and upconvert) its output sample stream and generate a downlink signal. K downlink signals from modulators 1032a through 1032k may be transmitted via antennas 1034a through 1034k, respectively.

At UE 1050, R antennas 1052a through 1052r may receive the K downlink signals from base station 1010, and each antenna 1052 may provide a received signal to an associated demodulator (DEMOD) 1054. Each demodulator 1054 may condition (e.g., filter, amplify, downconvert, and digitize) its received signal to obtain samples and may further process the samples (e.g., for OFDM) to obtain received symbols. Each demodulator 1054 may provide received data symbols to a MIMO detector 1060 and provide received reference symbols to a channel processor 1094. Channel processor 1094 may estimate the response of the downlink channel from base station 1010 to UE 1050 based on the received reference symbols and may provide a channel estimate to MIMO detector 1060. MIMO detector 1060 may perform MIMO detection on the received data symbols based on the channel estimate and provide symbol estimates, which may be estimates of the transmitted symbols. A receive processor 1070 may process (e.g., demodulate and decode) the symbol estimates based on the modulation and coding scheme(s) used for UE 1050, provide decoded data to a data sink 1072, and provide decoded control information to a controller/processor 1090.

UE 1050 may estimate the downlink channel response and generate channel feedback information, which may comprise reported channel vectors. UE 1050 may also estimate the downlink channel quality and determine channel quality indicator (CQI) information. Feedback information (e.g., the channel feedback information, CQI information, etc.), data from a data source 1078, and a reference signal may be processed (e.g., encoded and modulated) by a transmit processor 1080, precoded by a MIMO processor 1082, if applicable, and further processed by modulators 1054a through 1054r to generate R uplink signals, which may be transmitted via antennas 1052a through 1052r. At base station 1010, the R uplink signals from UE 1050 may be received by K antennas 1034a through 1034k and processed by demodulators 1032a through 1032k. A channel processor 1044 may estimate the response of the uplink channel from UE 1050 to base station 1010 and may provide a channel estimate to MIMO detector 1036. MIMO detector 1036 may perform MIMO detection based on the channel estimate and provide symbol estimates. A receive processor 1038 may process the symbol estimates, provide decoded data to a data sink 1039, and provide decoded feedback information to a controller/processor 1040. Controller/processor 1040 may control data transmission to UE 1050 based on the feedback information.

Controllers/processors 1040 and 1090 may direct the operation at base station 1010 and UE 1050, respectively. Processor 1094, processor 1090 and/or other processors and modules at UE 1050 may perform or direct process 500 in FIG. 5, and/or other processes for the techniques described herein. Processor 1044, processor 1040 and/or other processors and modules at base station 1010 may also perform or direct process 500 in FIG. 5, and/or other processes for the techniques described herein. Memories 1042 and 1092 may store data and program codes for base station 1010 and UE 1050, respectively. A scheduler 1046 may select UE 1050 and/or other UEs for data transmission on the downlink and/or uplink based on the feedback information received from the UEs.

In one aspect processor 1090 may be operable to provide means for determining failure of a first access request to a first base station due to interference from a second base station, and means for implementing one or more fallback access schemes in response to the determination. In another aspect, processor 1090 may provide means for detecting a first access request has fails more than a threshold number of times. In another aspect, processor 1090 may provide means for selecting a secondary carrier frequency for the first base station, and means for transmitting a second access request to the first base station using the selected secondary carrier frequency. In another aspect, processor 1090 may provide means for measuring uplink interference levels for at least two secondary carrier frequencies used by the first base station, and means for selecting the secondary carrier frequency as the one of the at least two secondary carrier frequencies having a lower interference level. In one such aspect, the processor may further provide means for randomly selecting the secondary carrier frequency from two or more secondary carrier frequencies. In another aspect, processor 1090 may provide means for detecting failure of the second access request on the selected secondary carrier frequency, means for selecting a different secondary carrier frequency used by the first base station, and means for transmitting a third access request to the first base station using the selected different secondary carrier frequency. In another aspect, processor 1090 may provide means for receiving secondary carrier frequency information on a broadcast channel from the first base station, and means for selecting the secondary carrier frequency based on the received secondary carrier frequency information. In another aspect, processor 1090 may provide means for detecting failure of the second access request on the selected secondary carrier frequency, means for designating the first base station as inaccessible, and means for measuring downlink strengths from one or more other base stations, wherein a base station designated as inaccessible is not included in the measuring. In another aspect, processor 1090 may provide means for designating the first base station as inaccessible, means for measuring downlink strengths from one or more other base stations, wherein a base station designated as inaccessible is not included in the measuring, means for determining the one of the other base stations having the strongest downlink signal strength, and means for transmitting a second access request to the determined one other base station. In another aspect, processor 1090 may provide means for designating the first base station as inaccessible for a defined duration of time.

In one aspect processor 1040 may be operable to provide means for determining, by a first base station, a failure to decode a signal from a UE, means for detecting that a signal received from a secondary base station is above an interference threshold, and means for broadcasting, using a primary carrier frequency, one or more secondary carrier frequencies for the UE to use for an initial access request. In another aspect, processor 1040 may provide means for receiving, using at least one of the one or more secondary carrier frequencies, the initial access request from the UE, and means for processing the initial access request. In another aspect, processor 1040 may provide means for receiving, by the first base station, signals from the UE and the second base station.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, TD-SCDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium, and/or computer readable medium known in the art. An example storage medium may be coupled to the processor, such that the processor can read information from, and write information to, the storage medium. An example computer readable medium may include memory. Further a computer program product may include a computer readable medium and its packaging. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method for facilitating one or more fallback access schemes, comprising:
 determining, for a first access request sent through an uplink channel of a first base station, a failure due to interference on transmissions on the uplink channel of the first base station caused by transmissions on a downlink channel from a second base station;
selecting one of a plurality of fallback access schemes in response to the determination; and
implementing one of the plurality of fallback access schemes in response to the selection.

2. The method of claim 1, wherein the first access request is an initial access request.

3. The method of claim 1, wherein the determining further comprises:
detecting that the first access request has failed more than a threshold number of times.

4. The method of claim 1, wherein the one of the plurality of fallback access schemes comprises:
selecting a secondary carrier frequency for the first base station; and
transmitting a second access request to the first base station using the selected secondary carrier frequency.

5. The method of claim 4, wherein the selecting further comprises:
measuring uplink interference levels for at least two secondary carrier frequencies used by the first base station; and
selecting the secondary carrier frequency as the one of the at least two secondary carrier frequencies having a lower interference level.

6. The method of claim 4, wherein the selecting further comprises:
randomly selecting the secondary carrier frequency from two or more secondary carrier frequencies.

7. The method of claim 4, wherein the selecting further comprises:
receiving secondary carrier frequency information on a broadcast channel from the first base station; and
selecting the secondary carrier frequency based on the received secondary carrier frequency information.

8. The method of claim 4, further comprising:
detecting a failure of the second access request on the selected secondary carrier frequency;
selecting a different secondary carrier frequency used by the first base station; and
transmitting a third access request to the first base station using the selected different secondary carrier frequency.

9. The method of claim 4, further comprising:
designating the first base station as being inaccessible upon detecting a failure of the second access request on the selected secondary carrier frequency;
and
measuring downlink signal strengths from one or more other base stations, wherein a base station designated as being inaccessible is not included in the measuring.

10. The method of claim 1, wherein the one of the plurality of fallback access schemes comprises:
designating the first base station as being inaccessible;
measuring downlink signal strengths from one or more other base stations, wherein a base station designated as being inaccessible is not included in the measuring;
determining the one of the other base stations having the strongest downlink signal strength; and
transmitting a second access request to the determined one other base station.

11. The method of claim 10, wherein the designating further comprises:
designating the first base station as being inaccessible for a defined duration of time.

12. The method of claim 10, further comprising:
detecting a failure of the second access request to the determined one other base station;
selecting a secondary carrier frequency for the determined one other base station; and
transmitting a third access request to the determined one other base station using the selected secondary carrier frequency.

13. A computer program product, comprising:
a non-transitory computer-readable medium comprising code for:
determining, for a first access request sent through an uplink channel of a first base station, a failure due to interference on transmissions on the uplink channel of the first base station caused by transmissions on a downlink channel from a second base station;
selecting one of a plurality of fallback access schemes in response to the determination; and
implementing one of the plurality of fallback access schemes in response to the selection.

14. The computer program product of claim 13, wherein the first access request is an initial access request.

15. The computer program product of claim 13, wherein the non-transitory computer-readable medium further comprises code for:
detecting that the first access request has failed more than a threshold number of times.

16. The computer program product of claim 13, wherein the non-transitory computer-readable medium further comprises code for:
selecting a secondary carrier frequency for the first base station; and
transmitting a second access request to the first base station using the selected secondary carrier frequency.

17. The computer program product of claim 16, wherein the non-transitory computer-readable medium further comprises code for:
measuring uplink interference levels for at least two secondary carrier frequencies used by the first base station; and
selecting the secondary carrier frequency as the one of the at least two secondary carrier frequencies having a lower interference level.

18. The computer program product of claim 16, wherein the non-transitory computer-readable medium further comprises code for:
randomly selecting the secondary carrier frequency from two or more secondary carrier frequencies.

19. The computer program product of claim 16, wherein the non-transitory computer-readable medium further comprises code for:
detecting a failure of the second access request on the selected secondary carrier frequency;
selecting a different secondary carrier frequency used by the first base station; and
transmitting a third access request to the first base station using the selected different secondary carrier frequency.

20. The computer program product of claim 16, wherein the non-transitory computer-readable medium further comprises code for:
receiving secondary carrier frequency information on a broadcast channel from the first base station; and
selecting the secondary carrier frequency based on the received secondary carrier frequency information.

21. The computer program product of claim 16, wherein the non-transitory computer-readable medium further comprises code for:

designating the first base station as being inaccessible upon detecting a failure of the second access request on the selected secondary carrier frequency; and measuring downlink signal strengths from one or more other base stations, wherein a base station designated as being inaccessible is not included in the measuring.

22. The computer program product of claim 13, wherein the non-transitory computer-readable medium further comprises code for:

designating the first base station as being inaccessible;

measuring downlink signal strengths from one or more other base stations, wherein a base station designated as being inaccessible is not included in the measuring;

determining the one of the other base stations having the strongest downlink signal strength; and transmitting a second access request to the determined one other base station.

23. The computer program product of claim 22, wherein the non-transitory computer-readable medium further comprises code for:

designating the first base station as being inaccessible for a defined duration of time.

24. The computer program product of claim 22, wherein the non-transitory computer-readable medium further comprises code for:

detecting a failure of the second access request to the determined one other base station;

selecting a secondary carrier frequency for the determined one other base station; and transmitting a third access request to the determined one other base station using the selected secondary carrier frequency.

25. An apparatus for wireless communications, comprising:

means for determining, for a first access request sent through an uplink channel of a first base station, a failure due to interference on transmissions on the uplink channel of the first base station caused by transmissions on a downlink channel from a second base station;

means for selecting one of a plurality of fallback access schemes in response to the determination; and means for implementing one of the plurality of fallback access schemes in response to the selection.

26. The apparatus of claim 25, wherein the first access request is an initial access request.

27. The apparatus of claim 25, wherein the means for determining further comprises:

means for detecting that the first access request has failed more than a threshold number of times.

28. The apparatus of claim 25, wherein the one of the plurality of fallback access schemes comprises:

means for selecting a secondary carrier frequency for the first base station; and means for transmitting a second access request to the first base station using the selected secondary carrier frequency.

29. The apparatus of claim 28, wherein the means for selecting further comprises:

means for measuring uplink interference levels for at least two secondary carrier frequencies used by the first base station; and means for selecting the secondary carrier frequency as the one of the at least two secondary carrier frequencies having a lower interference level.

30. The apparatus of claim 28, wherein the means for selecting further comprises:

means for randomly selecting the secondary carrier frequency from two or more secondary carrier frequencies.

31. The apparatus of claim 28, further comprising:

means for detecting a failure of the second access request on the selected secondary carrier frequency;

means for selecting a different secondary carrier frequency used by the first base station; and means for transmitting a third access request to the first base station using the selected different secondary carrier frequency.

32. The apparatus of claim 28, further comprising:

means for receiving secondary carrier frequency information on a broadcast channel from the first base station; and means for selecting the secondary carrier frequency based on the received secondary carrier frequency information.

33. The apparatus of claim 28, further comprising:

means for designating the first base station as being inaccessible upon means for detecting a failure of the second access request on the selected secondary carrier frequency; and means for measuring downlink signal strengths from one or more other base stations, wherein a base station designated as being inaccessible is not included in the measuring.

34. The apparatus of claim 25, wherein the one of the plurality of fallback access schemes comprises:

means for designating the first base station as being inaccessible;

means for measuring downlink signal strengths from one or more other base stations, wherein a base station designated as being inaccessible is not included in the measuring;

means for determining the one of the other base stations having the strongest downlink signal strength; and means for transmitting a second access request to the determined one other base station.

35. The apparatus of claim 34, wherein the means for designating further comprises:

means for designating the first base station as being inaccessible for a defined duration of time.

36. The apparatus of claim 34, further comprising:

means for detecting a failure of the second access request to the determined one other base station;

means for selecting a secondary carrier frequency for the determined one other base station; and means for transmitting a third access request to the determined one other base station using the selected secondary carrier frequency.

37. An apparatus for facilitating one or more fallback access schemes, comprising:

at least one processor configured to:

determine, for a first access request sent through an uplink channel of a first base station, a failure due to interference on transmissions on the uplink channel of the first base station caused by transmissions on a downlink channel from a second base station;

select one of a plurality of fallback access schemes in response to the determination; and implement one of the plurality of fallback access schemes in response to the selection; and a memory coupled to the at least one processor.

38. The apparatus of claim 37, wherein the first access request is an initial access request.

39. The apparatus of claim 37, wherein the at least one processor is further configured to:
  detect that the first access request has failed more than a threshold number of times.

40. The apparatus of claim 37, wherein the at least one processor is further configured to:
  select a secondary carrier frequency for the first base station; and
  transmit a second access request to the first base station using the selected secondary carrier frequency.

41. The apparatus of claim 40, wherein the at least one processor is further configured to:
  measure uplink interference levels for at least two secondary carrier frequencies used by the first base station; and
  select the secondary carrier frequency as the one of the at least two secondary carrier frequencies having a lower interference level.

42. The apparatus of claim 40, wherein the at least one processor is further configured to:
  randomly select the secondary carrier frequency from two or more secondary carrier frequencies.

43. The apparatus of claim 40, wherein the at least one processor is further configured to:
  detect a failure of the second access request on the selected secondary carrier frequency;
  select a different secondary carrier frequency used by the first base station; and
  transmit a third access request to the first base station using the selected different secondary carrier frequency.

44. The apparatus of claim 40, wherein the at least one processor is further configured to:
  receive secondary carrier frequency information on a broadcast channel from the first base station; and
  select the secondary carrier frequency based on the received secondary carrier frequency information.

45. The apparatus of claim 40, wherein the at least one processor is further configured to:
  designate the first base station as being inaccessible upon detecting a failure of the second access request on the selected secondary carrier frequency; and
  measure downlink signal strengths from one or more other base stations, wherein a base station designated as being inaccessible is not included in the measuring.

46. The apparatus of claim 37, wherein the at least one processor is further configured to:
  designate the first base station as being inaccessible;
  measure downlink signal strengths from one or more other base stations, wherein a base station designated as being inaccessible is not included in the measuring;
  determine the one of the other base stations having the strongest downlink signal strength; and
  transmit a second access request to the determined one other base station.

47. The apparatus of claim 46, wherein the at least one processor is further configured to:
  designate the first base station as being inaccessible for a defined duration of time.

48. The apparatus of claim 46, wherein the at least one processor is further configured to:
  detect a failure of the second access request to the determined one other base station;
  select a secondary carrier frequency for the determined one other base station; and
  transmit a third access request to the determined one other base station using the selected secondary carrier frequency.

* * * * *